US010486246B2

(12) United States Patent
Shpigelman et al.

(10) Patent No.: US 10,486,246 B2
(45) Date of Patent: Nov. 26, 2019

(54) END MILL HAVING A PERIPHERAL CUTTING EDGE WITH A VARIABLE ANGLE CONFIGURATION (71) Applicant: Iscar, Ltd., Tefen (IL)

(72) Inventors: Leonid Shpigelman, Carmiel (IL); Alexander Koifman, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/904,600

(22) Filed: Feb. 26, 2018

(65) Prior Publication Data

US 2019/0262913 A1    Aug. 29, 2019

(51) Int. Cl.
B23C 5/10       (2006.01)
B23C 5/00       (2006.01)

(52) U.S. Cl.
CPC ............. B23C 5/10 (2013.01); B23C 5/003 (2013.01); B23C 2210/0492 (2013.01); B23C 2250/16 (2013.01)

(58) Field of Classification Search
CPC ..... B23C 5/10; B23C 5/12; B23C 2210/0492; B23C 2210/40; B23C 2210/0457; B23C 2210/086; B23C 5/003; B23C 2250/16; B23P 15/34; B23B 2210/445
See application file for complete search history.

(56) References Cited

U.S. PATENT DOCUMENTS 1,840,852 A    12/1932 Schotthoefer
3,133,339 A     5/1964 Ribich
3,775,819 A    12/1973 Ribich
4,497,600 A     2/1985 Kishimoto
4,560,308 A    12/1985 Deller
4,963,059 A    10/1990 Hiyama
5,779,399 A     7/1998 Kuberski
6,007,276 A *  12/1999 Wardell .................... B23C 5/10
                                                                407/54

(Continued)

FOREIGN PATENT DOCUMENTS

DE    3742942 C1    12/1988
JP    S30-5244       7/1955

(Continued)

OTHER PUBLICATIONS

International Search Report dated Jul. 3, 2019, issued in PCT counterpart application (No. PCT/IL2019/050210).

(Continued)

Primary Examiner — Sara Addisu
(74) Attorney, Agent, or Firm — Womble Bond Dickinson (US) LLP (57) ABSTRACT An end mill for shouldering and/or slotting applications includes at least one tooth including a cutting edge. The cutting edge includes a first sub-edge extending rearwardly from a cutting end face and a second sub-edge extending rearwardly from the first sub-edge. An angle transition intersection defines where the first sub-edge ends and the second sub-edge starts. The angle transition intersection is located generally between 20% to 75% of an effective cutting length from a cutting end face and more specifically at a location within the general location where there is an increase in the rake angle and/or a significant increase in the helix angle of the cutting edge.

19 Claims, 4 Drawing Sheets

(56) References Cited

U.S. PATENT DOCUMENTS

| | | | |
|---|---|---|---|
| 6,164,876 A | 12/2000 | Cordovano | |
| 6,439,811 B1 * | 8/2002 | Wardell | B23C 5/10 407/54 |
| 6,742,968 B1 | 6/2004 | Volokh | |
| 6,899,494 B2 | 5/2005 | Walrath | |
| 6,991,409 B2 | 1/2006 | Noland | |
| 6,997,651 B2 | 2/2006 | Kawai et al. | |
| 7,204,663 B2 | 4/2007 | Dov et al. | |
| 7,306,408 B2 | 12/2007 | Wells et al. | |
| 7,563,059 B2 * | 7/2009 | Song | B23C 5/10 407/53 |
| 7,997,834 B2 | 8/2011 | Aoki et al. | |
| 8,221,036 B2 | 7/2012 | Volokh et al. | |
| 8,226,334 B2 * | 7/2012 | Hanks | B23C 5/10 407/59 |
| 8,414,228 B2 | 4/2013 | Wells et al. | |
| 8,647,025 B2 | 2/2014 | Davis et al. | |
| 8,858,128 B2 | 10/2014 | Budda et al. | |
| 9,346,109 B2 | 5/2016 | Xu et al. | |
| 9,481,041 B2 | 11/2016 | Davis et al. | |
| 2001/0018011 A1 | 8/2001 | Volokh | |
| 2001/0041104 A1 * | 11/2001 | Church | B23C 5/10 407/34 |
| 2002/0031409 A1 * | 3/2002 | Sato | B23C 5/10 407/53 |
| 2002/0102140 A1 * | 8/2002 | Thomas | B23C 5/10 407/53 |
| 2002/0141833 A1 | 10/2002 | MacArthur | |
| 2003/0118411 A1 * | 6/2003 | Flynn | B23C 5/10 407/53 |
| 2004/0120777 A1 | 6/2004 | Noland | |
| 2004/0258489 A1 | 12/2004 | Volokh | |
| 2006/0067797 A1 * | 3/2006 | Calamia | B23C 5/10 407/53 |
| 2007/0098506 A1 * | 5/2007 | Flynn | B23C 5/003 407/53 |
| 2010/0209201 A1 * | 8/2010 | Davis | B23C 5/10 407/60 |
| 2010/0215447 A1 * | 8/2010 | Davis | B23C 5/10 407/115 |
| 2011/0217132 A1 * | 9/2011 | Wells | B23C 5/10 407/54 |
| 2014/0119844 A1 | 5/2014 | Osawa et al. | |
| 2014/0133926 A1 * | 5/2014 | Budda | B23C 5/1009 407/54 |
| 2014/0161546 A1 | 6/2014 | Shpigelman et al. | |
| 2014/0227049 A1 | 8/2014 | Budda et al. | |
| 2014/0227050 A1 * | 8/2014 | Budda | B23C 5/10 407/54 |
| 2014/0341662 A1 | 11/2014 | Yamayose | |
| 2014/0356083 A1 | 12/2014 | Budda | |
| 2015/0147127 A1 * | 5/2015 | Shpigelman | B23C 5/10 407/54 |
| 2016/0067796 A1 | 3/2016 | Budda et al. | |
| 2016/0074947 A1 | 3/2016 | Shpigelman | |
| 2017/0100786 A1 | 4/2017 | Shpigelman | |
| 2017/0144234 A1 | 5/2017 | Shpigelman | |
| 2017/0216938 A1 * | 8/2017 | Tsuduki | B23C 5/12 |

FOREIGN PATENT DOCUMENTS

| | | |
|---|---|---|
| JP | 2006-110683 A | 4/2006 |
| JP | 2011-156622 | 8/2011 |

OTHER PUBLICATIONS

Written Opinion dated Jul. 3, 2019, issued in PCT counterpart application (No. PCT/IL2019/050210).

* cited by examiner

END MILL HAVING A PERIPHERAL CUTTING EDGE WITH A VARIABLE ANGLE CONFIGURATION

FIELD OF THE INVENTION

The subject matter of the present application relates to an end mill configured for shouldering and/or slotting applications, and particularly comprising a peripheral cutting edge with a variable angle configuration.

BACKGROUND OF THE INVENTION

Varying angles along a single cutting edge are known from numerous publications, e.g. from U.S. Pat. No. 6,991,409, and the article "Variations on a theme" (Cutting tool engineering magazine, October 2004, Volume 56, Number 10).

In the above-mentioned article, it is noted there are different usages of the term "variable". In the present application, such usage is directed to a single peripheral edge which has an angle that has at least one different value at different axial locations therealong (i.e. the angle is not compared to angles of other cutting edges circumferentially spaced about the end mill, separated by flutes, but rather along the same edge). It will be understood that such end mill can also include additional cutting edges on other teeth of the end mill which have variable angles along their respective axial lengths, and which also may be different to other cutting edge values at the same axial location.

In the above publications, variable angles are utilized to reduce chatter, which in turn can increase tool life. While all features of an end mill are typically connected to improving tool life, the subject matter of the present application uses variable angles in a different way to improve tool life.

In particular, the present application is believed beneficial for end mills designed to mill using peripherally extending cutting edges (i.e. edges extending along a basic axial direction of an end mill rather than edges located at a cutting end face of an end mill). For example, shouldering applications use peripherally extending edges to mill around an external periphery of a workpiece, typically, but not limited to, a depth equal to the diameter of the end mill ("1D") or often a depth twice the diameter ("2D"). Similarly, slotting applications can use the peripheral edges of the mill to enter a workpiece to create a slot or like-shapes at similar depths. It should be understood that the terminology of "end mill configured for shouldering and/or slotting applications" is not intended to exclude end mills which are also configured for facing operations (i.e. milling using axial edges at the cutting end face) but is intended to exclude end mills configured for facing operations only and not configured for shouldering and/or slotting operations (i.e. face mills).

For succinctness, all of the angles discussed herein are to be understood as relating to a peripherally extending cutting edge or tooth and not an axial cutting edge or tooth located at a cutting end face or even a corner cutting edge extending between an axial tooth and a peripheral tooth. Thus, the abbreviated name "cutting edge" can be used below instead of "peripheral cutting edge". Accordingly, it will be understood that the term rake angle herein could more specifically be called a radial rake angle. This should not be understood to mean a given tooth does not also comprise an axial cutting edge or axial rake angle.

Generally speaking, in the specification and the claims, unless an angle is stated to be the "same" along a given sub-edge, said angle can be variable. For example, when stated that a cutting edge has "a helix angle" there may be different helix angles along the sub-edge, i.e. a range of angles.

SUMMARY OF THE INVENTION

It has been observed that the initial wear of an end mill's peripheral edge during shouldering and/or slotting applications occurs along a portion of the effective cutting length closer to the cutting end face than the shank. Without being bound to theory, it is believed that the greatest amount of wear typically occurs at said portion by virtue of the fact it is incurred there first (i.e. the cutting edge nearer to the cutting end face contacts the workpiece earlier) and thus continues to contact the workpiece for the longest period of time relative to the remainder of the cutting edge.

The subject matter of the present invention is directed to an end mill comprising a tooth configured with one or more variable angles designed to delay wear proximate to a cutting end face, and thereby increase tool life of the end mill.

It will be understood that a precise position of said initial wear differs, i.e. starts at different axial locations, due to different machining conditions (e.g. depth of cut) or applications (e.g. slotting vs shouldering, machining depth etc.). Nonetheless it typically occurs at an axial location within 20% to 75% of the effective cutting length from a cutting end face, and even more commonly within 20% to 50% thereof.

In accordance with a first aspect of the subject matter of the present application, there is provided an end mill for shouldering and/or slotting applications, wherein at least one cutting edge has a variable angle configuration located 20% to 75% of an effective cutting length from a cutting end face.

The variable angle can either be a rake angle, a helix angle, or both can be variable.

Hereinafter instead of the more commonly used terminology "variable angle (configuration)", a more precise definition referring to an "angle transition intersection", i.e. a location where the angle varies, and also the type of angle varied, will be used.

Accordingly, and more precisely, there is provided an end mill for shouldering and/or slotting applications, wherein at least one cutting edge has an angle transition intersection located 20% to 75% of an effective cutting length from a cutting end face, the location of the angle transition intersection being defined at the forwardmost occurring one, or both if located at the same axial location, of the following conditions: a first condition where a rake angle at angle transition intersection is larger than all rake angles closer to the cutting end face, or a second condition where a helix angle at the angle transition intersection is significantly larger than a helix angle directly adjacent and forward of the angle transition intersection.

To explain the first condition, since a cutting edge is more prone to wear with a higher rake angle (due to the sharper edge shape impacting a workpiece) by dulling the edge in the portion where the wear is expected to initiate, the amount of wear developing there is delayed.

It should be understood that a comparatively duller edge cuts a workpiece less effectively than a comparatively sharper edge and hence there is also a reduction in cutting efficiency at the forwardmost portion, nonetheless it has been found that the extended tool life provides an overall advantage.

To explain the second condition, which uses a different mechanism to prolong tool life, it is believed that by creating a significant helix angle variation (quantitatively defined as an abrupt change of at least 5% as described further below) a significant axial distance rearward from a cutting end face, a chip being formed is abruptly bumped (as opposed to the typical smooth cutting motion created by a constant or gradually curving helical cutting edge). Such bumping action is believed to increase initial wear where the impact occurs rather than at the more vulnerable area closer to the cutting end face. Stated differently, such feature is a deliberate attempt to increase wear at a particular position and thereby control the progression thereof.

A benefit of an end mill using both conditions, in addition to the separate beneficial functions described above, is: by reducing the rake angle in the expected area of wear, the wear is delayed but the cutting efficiency is also reduced; a higher and hence more aggressive helix angle can consequently improve the cutting efficiency and compensate for the reduced cutting efficiency caused by the duller edge. While the two features would seem to counter each other's effect, it is believed that a relatively sharp cutting edge is the greater cause of wear than a more aggressive cutting operation caused by a higher helix angle, and hence it is believed the complimentary effect of both features together is beneficial.

Tools tested showed a delay in wear in the typical region close to the front cutting surface and the start of development at the angle transition intersection resulting in the desired extended tool life for which these features were developed. Interestingly and atypically, during experimentation, it was observed that after wear developed at the angle transition intersection, it then increased in a rearward direction (i.e. away from the cutting end face) and only subsequently increased in a forward direction from angle transition intersection.

While the variable rake angle configuration described above will be readily understood to be particularly advantageous for positive rake angles, i.e. with the forwardmost portion having a lower yet still positive rake angle (e.g. 3°) and the portion rearward thereof to have a higher positive rake angle (e.g. 7°), in theory the advantage of this concept can also be applied to initially negative rake angles (e.g. starting at −3° and transitioning to 3°). It will be understood that the exemplary values in this paragraph are merely provided for explanatory purposes.

Similarly, while the variable rake and/or helix angle configurations are not considered limited to a specific application, their initial conception was for workpieces made of high heat transfer materials such as stainless steel which can rapidly degrade an end mill. With such workpieces positive rake angle(s) along the cutting edge(s) are particularly beneficial. It will be further noted that such high heat transfer materials are relatively "sticky" when machined and so the conventional wisdom is that they require the sharper more positive rake angles. Nonetheless, test results showed that reducing rake angles near a cutting end face of the end mill for such materials were indeed beneficial.

It will be further noted that some known end mills having wavy edges or repetitive variations of angles, and may coincidentally fulfill at least one of the conditions mentioned above. However, these end mills are not believed to achieve the delayed wear adjacent a cutting end face, since, as far as is known, such variable angles also appear closer to the cutting end face (i.e. closer than 20% of the effective cutting length to the cutting end face). To elaborate the subject matter of the present application primarily provides an end mill portion comprising a less aggressive cutting portion configuration closer to the cutting end face (such portion having a significant cutting length of at least 20% of the effective cutting length) followed by a configuration designed for relatively more aggressive cutting. It will also be understood that an end mill of the present application can preferably, but optionally, have exactly (only) one angle transition intersection, located as defined above, to achieve the desired aim. It will be noted that the axial location of the angle transition intersection can be as far as 75% of the effective cutting length from the cutting end face, even though the initial wear more typically occurs within 20% to 50% of the effective cutting length from the cutting end face. In some preferred embodiments the angle transition intersection can be located within 25% to 45% of the effective cutting length.

This is because a less aggressive cutting region even extending slightly past the optimal 20% length is still believed to provide an advantageous effect, given that at least some subsequent cutting length is subjected to relatively higher wear (i.e. at least the furthest 25% of the effective cutting length from the cutting end face). It should be understood that dulling the edge cutting edge nonetheless is less effective in cutting and therefore it is of course still preferable for the angle transition intersection to be located closer to the cutting end face. Accordingly, preferred ranges with shorter lengths (i.e. distances from the cutting end face to the angle transition intersection) are provided below.

Notably, not every cutting edge of a single end mill need be provided with the advantageous configuration above. It will be understood that in some end mills different edges can have different functions. It will also be understood that even reducing the wear of a single tooth can improve tool life of an end mill. Nonetheless, clearly there can be an advantage in some applications for two or more, or even all of the cutting edges of a single end mill to have such configuration (i.e. to have such angle transition intersection).

In accordance with a second aspect, there is provided an end mill having unitary one-piece construction and configured for shouldering and/or slotting applications and rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising:

opposite rear and cutting end faces, and a peripheral surface extending therebetween;

a shank portion extending forward from the rear end face; and a cutting portion extending forward from the shank portion to the cutting end face;

the cutting portion comprising:
  a diameter ($D_E$);
  an effective cutting length ($L_E$);
  a plurality of integrally formed teeth; and
  a plurality of flutes alternating with the plurality of teeth;
at least one tooth of the plurality of teeth comprising:
  a rake surface;
  a relief surface succeeding the rake surface and having a relief surface width which is measurable in a plane perpendicular to the rotation axis ($A_R$); and
  a cutting edge formed at an intersection of the rake and relief surfaces;
the cutting edge comprising:
  a first sub-edge extending rearwardly from the cutting end face;
  a second sub-edge extending rearwardly from the first sub-edge; and an angle transition intersection defining where the first sub-edge ends and the second sub-edge starts;
the first sub-edge comprising:
  a first radial rake angle;
  a first helix angle; and
  a first relief angle;
the second sub-edge comprising:
  a second radial rake angle;
  a second helix angle; and
  a second relief angle;
the angle transition intersection comprising:
  an intersection rake angle;
  an intersection helix angle; and
  an intersection relief angle;
wherein, for the cutting edge:
  the angle transition intersection is generally located in a general location GL which is an axial distance from the cutting end face defined by the condition: $0.20L_E \leq GL \leq 0.75L_E$; and
  the angle transition intersection is precisely located at a precise location PL within the general location GL, the precise location PL being defined as a closest axial location to the cutting end face, within the general location GL, which fulfills at least one of:
    a first condition wherein the intersection rake angle is greater than all of the rake angles which are closer to the cutting end face; and
    a second condition wherein the intersection helix angle is at least 5% greater than a first helix angle directly preceding the intersection helix angle.

In accordance with a third aspect of the subject matter of the present application, there is provided an end mill for shouldering and/or slotting applications, wherein at least one flute of a plurality of flutes comprises a sub-flute extending from the cutting end face in a rearward direction and having a sub-flute boundary; the sub-flute extending from a cutting edge of a first tooth of the plurality of teeth towards a second tooth of the plurality of teeth in a preceding direction.

The sub-flute can be provided to reduce a rake angle of a cutting edge adjacent thereto. While such sub-flute would ordinarily be thought to be a cumbersome way to provide a different rake angle along a single cutting edge, the sub-flute allows easy production of an angle transition intersection.

It should be understood that there will always be a transition region from one sub-edge to another, in a single cutting edge. For example, from an axial cutting edge, where one exists, to a first sub-edge there is a transition region. Similarly, there is a transition region from the first sub-edge to the angle transition intersection, etc. Accordingly features defining an angle having the "same value" along the length of a certain sub-edge should not be considered to include these transition regions. For example, a feature: "each first rake angle of the first sub-edge can have the same value" should be interpreted as "each first rake angle of the first sub-edge excluding the transition regions" or alternatively interpreted as "a majority of the adjacent first rake angles of the first sub-edge can have the same value". This understanding is also applicable to all other angles stated to have the "same value" in the specification and claims, not just the example used.

It will also be understood that the above-said is a summary, and that any of the aspects above may further comprise any of the features described hereinbelow. Specifically, the following features, either alone or in combination, may be applicable to any of the above aspects:

A. An end mill can be configured for configured for shouldering and/or slotting applications and rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction. The end mill can comprise opposite rear and cutting end faces, and a peripheral surface extending therebetween. The end mill can comprise a shank portion extending forward from the rear end face, and a cutting portion extending forward from the shank portion to a cutting end face. The cutting portion can comprise a diameter ($D_E$); an effective cutting length ($L_E$); a plurality of integrally formed teeth; and a plurality of flutes alternating with the plurality of teeth. Each tooth of the plurality of teeth can comprise a rake surface; a relief surface succeeding the rake surface; and a cutting edge formed at an intersection of the rake and relief surfaces. Each relief surface can have a relief surface width which is measurable in a plane perpendicular to the rotation axis ($A_R$).

B. At least one, preferably at least two, and most preferably each, cutting edge can comprise a first sub-edge extending rearwardly from the cutting end face; a second sub-edge extending rearwardly from the first sub-edge; and an angle transition intersection defining where the first sub-edge ends and the second sub-edge starts. Each first sub-edge can comprise a first radial rake angle; a first helix angle; and a first relief angle. Each second sub-edge can comprise a second radial rake angle; a second helix angle; and a second relief angle. Each angle transition intersection can comprise: an intersection rake angle; an intersection helix angle; and an intersection relief angle.

C. An end mill can preferably have a tapered core (i.e. the core enlarging with increased distance from the cutting end face).

D. An end mill can comprise at least one flute which in turn comprises a sub-flute extending from a cutting end face in a rearward direction therefrom and the sub-flute can comprise a sub-flute boundary. The sub-flute can extend from a cutting edge of a first tooth towards a second tooth in a preceding direction. The sub-flute boundary can be spaced-apart from the second tooth's relief surface. By not allowing the sub-flute boundary to reach the second tooth's relief surface a relief surface width thereof is not reduced, which can allow the width thereof to be controlled more easily (than a cheaper single manufacturing step) with a separate manufacturing step.

E. An angle transition intersection can be generally located in a general location GL which is an axial distance from the cutting end face defined by the condition: $0.20L_E \leq GL \leq 0.75L_E$. Preferably, the angle transition intersection can be defined by the condition: $0.20L_E \leq GL \leq 0.50L_E$, or more preferably $0.25L_E \leq GL \leq 0.45L_E$. The angle transition intersection can be precisely located at a precise location PL within the general location GL, the precise location PL being defined as a closest axial location to the cutting end face, within the general location GL, which fulfills at least one of: a first condition wherein the intersection rake angle is greater than all of the rakes angle which are closer to the cutting end face; and a second condition wherein the intersection helix angle is at least 5% greater than a first helix angle directly preceding the intersection helix angle.

F. There preferably is only a single transition intersection having one of the two conditions along a given cutting edge.

G. Both of the two conditions for defining a precise location PL can be within an axial separation distance $L_P$ no greater than $0.15L_E$. Preferably, the axial separation distance $L_P$ is no greater than $0.05L_E$, most preferably no greater than $0.02L_E$.

H. An intersection rake angle can be at least 20% greater than a first rake angle directly adjacent thereto, preferably at least 30% greater.

I. Each first rake angle along the first sub-edge can have a positive value.

J. Each first rake angle of the first sub-edge can have the same value. For example, the rake angle can be 3°, measured at different points along the first sub-edge.

K. An intersection helix angle can be at least 10% greater than the first helix angle directly adjacent thereto, preferably at least 14% greater.

L. According to one preferred embodiment general location can be located between 20% to 40% of the effective cutting length from the cutting end face, and each first helix angle along the first sub-edge has the same value. Testing of such embodiment has been found to be advantageous for slotting applications. According to a second, alternative, preferred embodiment, a general location can be located from 40% to 75% of the effective cutting length from the cutting end face and the first helix angle along the first sub-edge decreases in value with increasing proximity to the angle transition intersection. Testing of the second embodiment has been found to be advantageous for shouldering applications.

M. An intersection relief angle can be smaller than at least one of the first relief angles measurable along the first sub-edge. This is particularly beneficial when the intersection rake angle is greater than the first rake angle directly adjacent thereto. In such case it is preferred that the intersection relief angle is smaller than the first relief angle directly adjacent thereto.

N. A first relief angle gradually can increase from a cutting end face in a rearward direction toward an angle transition intersection.

O. A visible relief discontinuity can be formed along a first sub-edge.

P. Each internal tooth angle measurable between the rake surface and the relief surface at each axial location along the first sub-edge can have the same value.

Q. Each relief surface can comprise a relief surface width measurable in a plane perpendicular to the rotation axis ($A_R$). Each relief surface width, at each axial location along the first sub-edge, can increases from the cutting end face with increasing distance therefrom. It will be understood that having a small relief surface width near the cutting end face can allow additional chip evacuation space where it is most needed (near the cutting end face). The relief surface width, at each axial location along the second sub-edge, can have the same value. It will be understood that in the less critical region (further from the cutting end face) a simpler manufacturing design, i.e. having a constant relief surface width, is preferable.

R. A first helix angle of a cutting edge can vary in value with increasing distance from the cutting end face to the angle transition intersection and a second helix angle of the cutting edge can have a same value with increasing distance from the angle transition intersection to the end of the effective cutting length. The varying helix angle can provide a benefit near the more critical cutting end face region and further therefrom a simpler manufacturing design, i.e. having a same (i.e. constant) helix angle, is preferable. Similarly, an additional (second) cutting edge of a tooth of the plurality of teeth can have a first helix angle which varies in value with increasing distance from the cutting end face to an angle transition intersection and can have a second helix angle having a same value from with increasing distance from the angle transition intersection to the end of the effective cutting length. Preferably, the second helix angle of the additional (second) cutting edge is different to the second helix angle of said, previously defined, cutting edge. Thus even though the simpler constant helix angles are used in the second sub-edges, the values of each being different to each other still provides a beneficial anti-vibration effect. It will be understood that it is preferred for a majority of the cutting edges to have different helix values.

S. An effective cutting length ($L_E$) of an end mill can be greater than the diameter (1.0D) or even greater than 1.5D.

T. A plurality of teeth of the end mill is preferably equal to or greater than five teeth. For the applications described above, a high number of teeth, is at least five. However, increasing the number of teeth reduces available flute space. According the plurality of teeth is preferably equal to or less than 11 teeth. Most preferably the plurality of teeth is equal to 5, 7 or 9 teeth, with 7 teeth being considered the most preferred number of teeth taking into account flute space. Preferably the plurality of teeth is an odd number of teeth for reducing vibration due to non-symmetry.

U. At least one or preferably each tooth of a cutting portion can be positioned front-of-center.

V. In a rearward direction from a cutting end face, index angles between each adjacent pair of cutting edges in cross-sections of the cutting portion can approach equality and subsequently diverge therefrom. Preferably said index angles can approach equality with increasing proximity to a middle of the effective cutting length.

W. Index angles at a front end of an end mill can correspond to index angles at a rear end of the effective cutting length. A majority of index angles at a front end of the end mill can be unequal.

X. A diameter $D_E$ of the end mill can be a constant value throughout the effective cutting length. When interpreting the claims the diameter to be considered should be the one at the axial location specified or, if not specified, the diameter at the end cutting face.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figure 1:
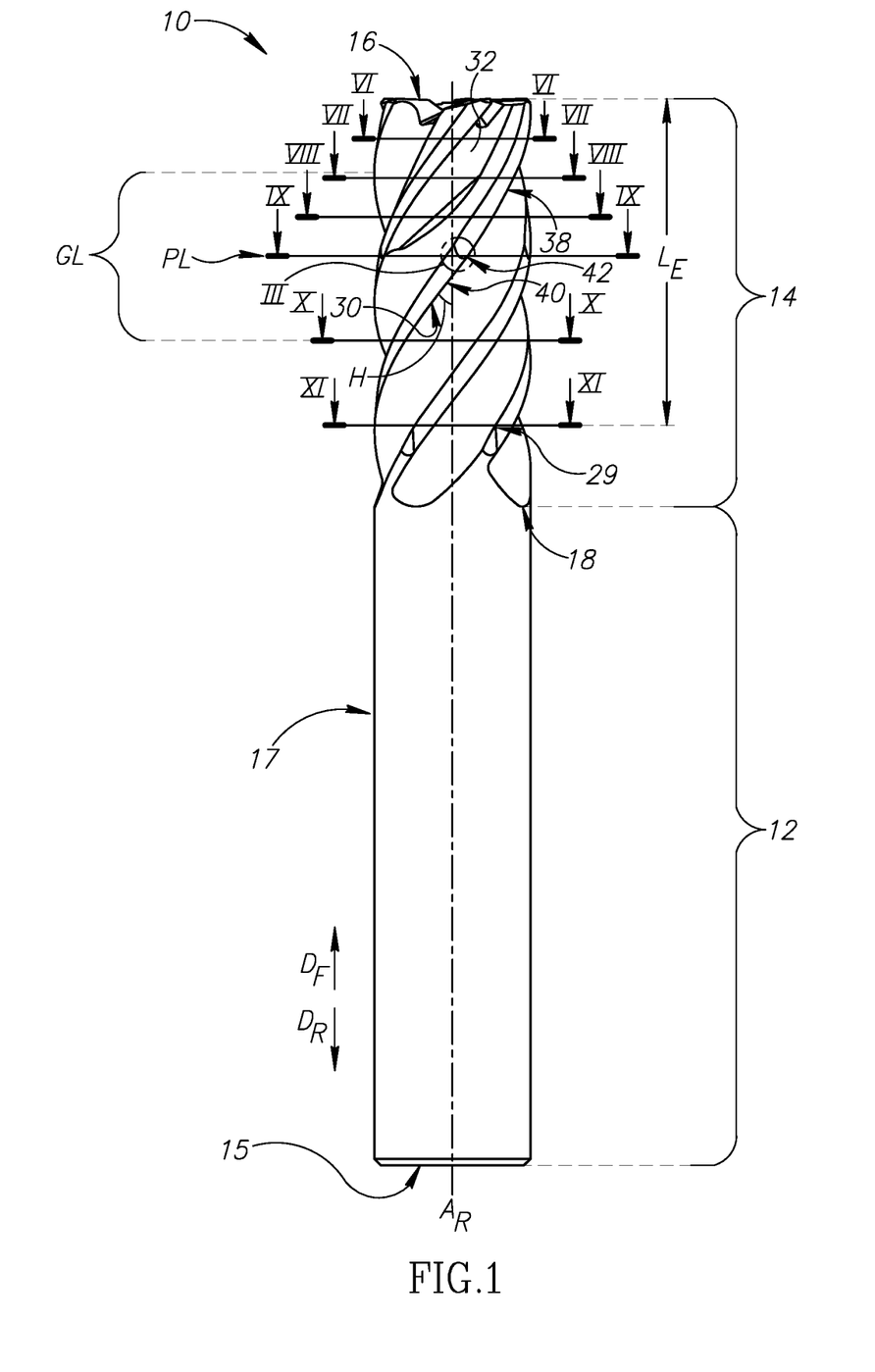
FIG. 1 is a side view of an end mill according to an example of the present invention.
Figure 2:
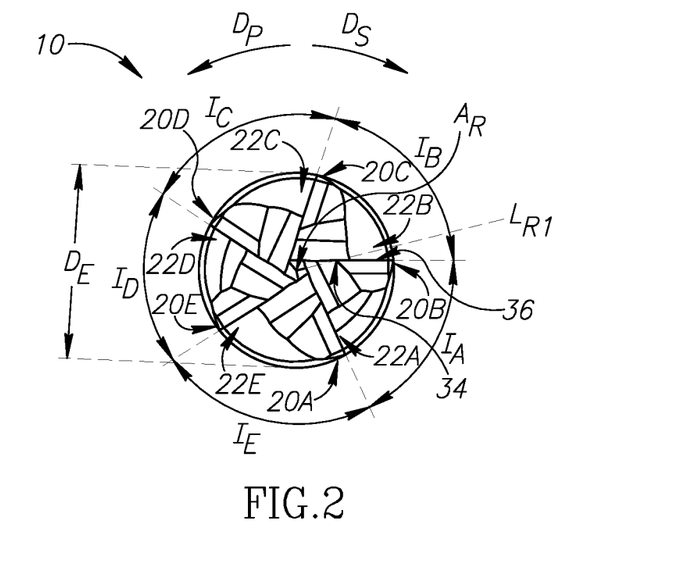
FIG. 2 is an end view, along a rotation axis $A_R$, of a cutting end face of the end mill in FIG. 1.

FIGS. 1 and 2 illustrate an end mill 10, typically made of extremely hard and wear-resistant material such as cemented carbide, configured for rotating about a central rotation axis $A_R$ which extends longitudinally through the center thereof. The end mill 10 has unitary one-piece construction (i.e. it is devoid of replaceable cutting inserts).

The central rotation axis $A_R$ defines opposite axially forward and rearward directions $D_F$, $D_R$, and opposite rotational preceding and succeeding directions $D_P$, $D_S$, the preceding direction $D_P$ being the cutting direction.

The end mill 10 comprises a shank portion 12 and a cutting portion 14 extending in the forward direction $D_F$ therefrom.

The shank portion 12 extends in the forward direction $D_F$ from a rear end face 15 to a furthermost flute end 18.

The cutting portion 14 extends in the rearward direction $D_R$ from a cutting end face 16 to the furthermost flute end 18.

A peripheral surface 17 extends from the rear end face 15 to the cutting end face 16.

The cutting portion 14 is integrally formed with first, second, third, fourth and fifth teeth 20A, 20B, 20C, 20D, 20E (hereinafter generally referred to as "tooth/teeth 20") alternated with helically shaped first, second, third, fourth and fifth flutes 22A, 22B, 22C, 22D, 22E (hereinafter generally referred to as "flute(s) 22").

To explain relative terminology used herein, for example, the first flute 22A is adjacent to the first tooth 20A in the preceding direction $D_P$, and could therefore be described as the flute which precedes the first tooth 20A.

Figure 11:
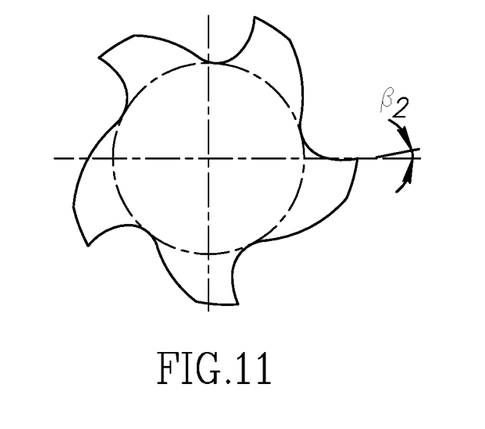
FIG. 11 is a cross-section view taken along line XI-XI in FIG. 1, corresponding to an axial location 100% of the effective cutting length from the cutting end face.

An effective cutting length $L_E$ of the cutting portion 14 extends from the cutting end face 16 to an axial location where tooth relief surfaces are no longer effective, which is visible in this example at the axial location designated with the reference character "29" (in this example the axial location of the end of the effective cutting length $L_E$ coincides with section XI-XI).

The outer edge of the cutting portion 14 is substantially cylindrical, and a diameter $D_E$ (FIG. 2) of the end mill is measurable at the cutting end face 16 thereof.

As shown from the unbroken appearance of the teeth 20 in FIG. 1, the teeth 20 are non-serrated.

In FIG. 2, for understanding, exemplary first, second, third, fourth and fifth index angles are shown $I_A$, $I_B$, $I_C$, $I_D$, $I_E$ extending between the cutting edges of the teeth 20.

Referring to FIG. 1, aside from the cutting end face 16 (i.e. the front axial position of the effective cutting length $L_E$) and the axial position of section XI-XI (i.e. the rear axial position of the effective cutting length $L_E$) intermediary axial locations or sections (or views of a plane perpendicular to the central rotation axis $A_R$) have been chosen for explanatory purposes only.

Figure 4:
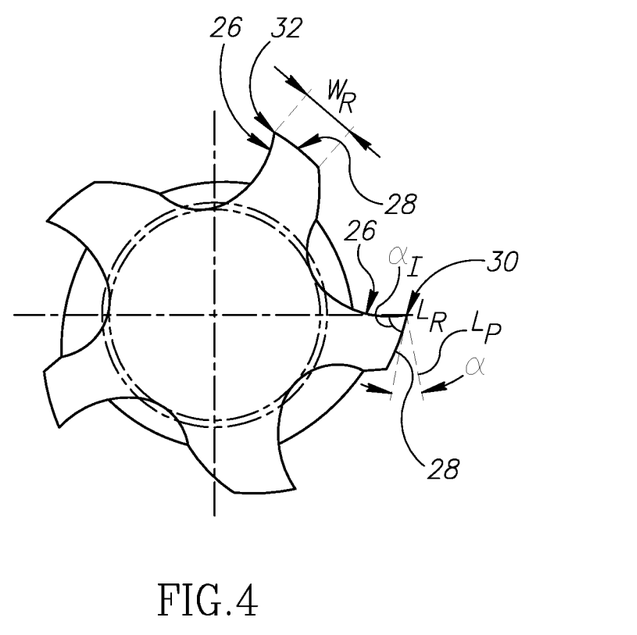
FIG. 4 is an end view of the cutting end face, similar to FIG. 2, except before any facing operations have been carried out.
Figure 5:
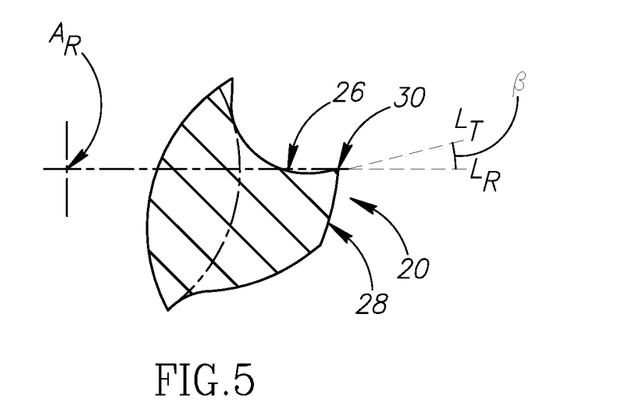
FIG. 5 is a schematic partial cross-section view of a tooth, along a rotation axis $A_R$.

Basic tooth geometry and angle definitions, as shown in FIGS. 4 and 5, are generally explained below.

Each tooth 20 comprises a rake surface 26, a relief surface 28 and a cutting edge 30 (i.e. a radial cutting edge).

Each relief surface 28 has a relief surface width $W_R$.

As seen in the cross-section of FIG. 4, the cutting edge 30 comprises a relief angle α. Relief angle α is measurable between (a) a perpendicular line $L_P$ which passes through the cutting edge 30 and is perpendicular to a radial line $L_R$ extending from the central rotation axis $A_R$ to the cutting edge 30), and (b) the relief surface 28 associated with that cutting edge 30.

The cutting edge 30 further comprises a radial rake angle β. An exemplary radial rake angle β is shown in FIG. 5 and is measurable between a radial line $L_R$ extending from the central rotation axis $A_R$ to a cutting edge 24 and a tangent line $L_T$ extending tangentially from an associated rake surface 26.

An exemplary helix angle H is shown in FIG. 1 and is measurable relative to the central rotation axis $A_R$ at an axial position along the cutting edge 30 (according to some terminologies the helix angle is defined relative to the flute, however it will be understood here that the same physical parameter can be defined with relative to the cutting edge).

Referring to FIG. 2, the teeth 20 are each positioned front-of-center, as shown. To elaborate what is meant by "front-of-center", a first radial line $L_{R1}$ is drawn from the central rotation axis $A_R$ to intersect a start point 34 of an axial sub-edge 36, in this example of the second tooth 20B. Since every point of the entire cutting edge 36 is located rotationally behind the radial line $L_{R1}$ (i.e. in the succeeding direction $D_S$), when the material being machined (not shown) contacts any portion of the cutting edge 30 it is ejected outwardly from the end mill 10.

Referring to FIG. 1, a tooth designated 20 is shown. The tooth 20 comprises a first sub-edge 38 extending rearwardly from the cutting end face 16, a second sub-edge 40 extending rearwardly from the first sub-edge 38; and an angle transition intersection 42 defining where the first sub-edge 38 ends and the second sub-edge starts 40.

It is understood that the first and second sub-edges 38, 40 and the angle transition intersection 42 have radial rake angles, helix angles and relief angles at each axial location, of the type defined above.

As explained above, the angle transition intersection 42 is always located in a general location GL which is an axial distance from the cutting end face 16 defined by the condition: $0.20L_E \leq GL \leq 0.75L_E$. As the line VII-VII in FIG. 1 corresponds to an axial location 25% of the effective cutting length, the general location GL starts between the VI-VI line and the VII-VII line and ends at line X-X located exactly at an axial location 75% of the effective cutting length from the cutting end face 16.

For a given tooth, the precise location PL of the angle transition intersection 42 within the general location GL, is at the closest axial location to the cutting end face 16 where (a) the intersection rake angle is greater than all other rake angles closer to the cutting end face 16, and/or (b) the intersection helix angle is at least 5% greater than a first helix angle directly preceding the intersection helix angle.

Figure 3:
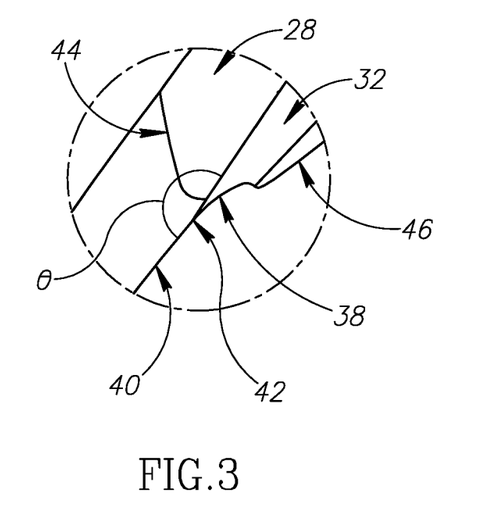
FIG. 3 is an enlarged view of the encircled portion designated III in FIG. 1.
Figure 9:
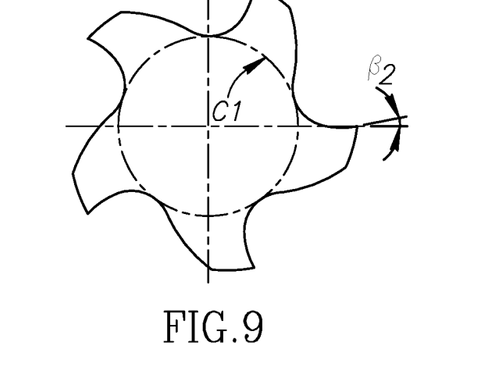
FIG. 9 is a cross-section view taken along line IX-IX in FIG. 1, corresponding to an axial location 50% of the effective cutting length from the cutting end face.
Figure 10:
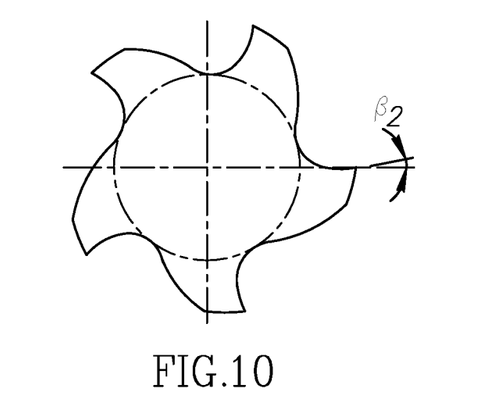
FIG. 10 is a cross-section view taken along line X-X in FIG. 1, corresponding to an axial location 75% of the effective cutting length from the cutting end face.

In the example given, both of these conditions occur at the same axial location, which in this example is at 50% of the effective cutting length from the cutting end face 16, as shown in FIG. 1 and in more detail in FIGS. 3 and 9.

Figure 6:
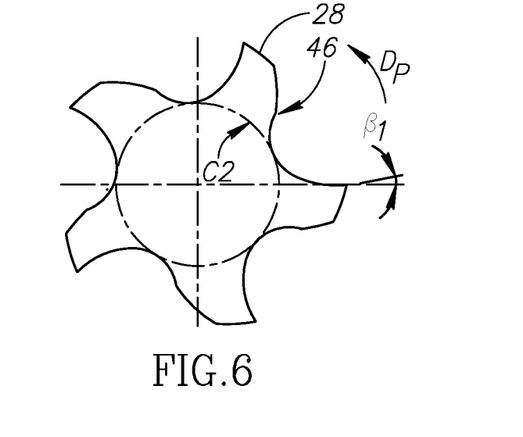
FIG. 6 is a cross-section view taken along line VI-VI in FIG. 1, corresponding to an axial location 12.5% of the effective cutting length from the cutting end face.
Figure 7:
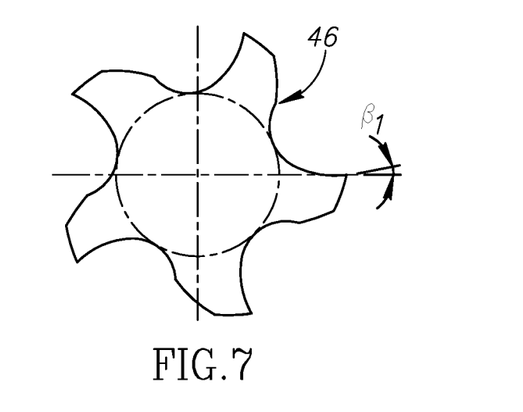
FIG. 7 is a cross-section view taken along line VII-VII in FIG. 1, corresponding to an axial location 25% of the effective cutting length from the cutting end face.
Figure 8:
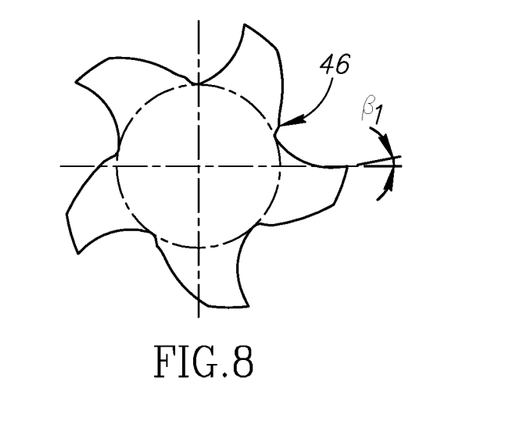
FIG. 8 is a cross-section view taken along line VIII-VIII in FIG. 1, corresponding to an axial location 37.5% of the effective cutting length from the cutting end face.

Regarding the first condition, the rake angles of an exemplary tooth are shown in FIGS. 6 to 11. In FIGS. 6 to 8 the rake angle $β_1$ of the first sub-edge 38 has a positive value of 8° and in FIGS. 9 to 11 the rake angle $\beta_2$ of the same tooth (FIG. 9 being at angle intersection 42 and FIGS. 10-11 being at the second sub-edge 40) has a positive value of 11°. This is an abrupt increase of 38% (11/8=1.38=38%). For sake of completeness, even though the measurements shown were taken along selected axial positions, it will be understood that the entire first sub-edge 38 has a single/same rake angle (i.e. 8°) and the entire second sub-edge 40 has a single/same rake angle (i.e. 11°). For the sake of clarity, the rake angle $\beta_1$ of the first sub-edge is 8°, the rake angle $\beta_2$ of the angle transition intersection is 11° and the rake angle of the second sub-edge is also 11°. It will be understood that it is not essential for the rake angle of the second sub-edge to have the same value as the angle transition intersection, although it is advantageous that it has a greater value than the first sub-edge (for increased cutting efficiency).

Referring to FIG. 3, while the change in rake angle cannot be seen in this view, a change in relief angle was designed to coincide with the change in rake angle and is visible via a relief discontinuity 44. While a change in relief angle at the location of the change in rake angle is not essential, it is a preferred option since it maintains a constant internal tooth angle. To elaborate, in this example the relief angle along the first sub-edge is equal to 12° and along the second sub-edge is equal to 9°, corresponding to the 3° change of the rake angle. For the sake of clarity, the relief angle of the first sub-edge is 12°, and the relief angle of the angle transition intersection and, optionally, the second sub-edge is 9° (it will be understood that maintaining a relatively constant internal tooth angle, schematically shown in FIG. 4 as $\alpha_I$, is advantageous, in the present example $\alpha_I$=70° which is calculated as 90°−relief angle−rake angle; this equaling 90°−12°−8°=70° along the first sub-edge and 90°−9°−11°=70° along the second sub-edge).

Regarding the second condition, the helix angle H of cutting edges at the cutting end face 16 for the cutting edges of the first and third teeth (20A, 20C) is 42° and this value progressively decreases to 35° at a portion of the first edge 38 directly adjacent to the transition intersection. At the transition intersection, however, the helix angle abruptly becomes 40°. This is an abrupt increase of 36% (40/35=1.14=14%). For the sake of clarity, the helix angle of the first sub-edge directly adjacent to the angle transition intersection is 35°, the helix angle of the angle transition intersection is 40° and the helix angle of the second sub-edge stays at 40°, although it will be understood that it is not essential for the helix angle of the second sub-edge to have the same value.

The helix angle H for the second, fourth and fifth teeth (20B, 20D, 20E) is 40° and this value progressively decreases to 33° at a portion of the first edge 38 directly adjacent to the transition intersection. At the transition intersection, the helix angle abruptly becomes 38°. This is an abrupt increase of 40% (38/33=1.15=15%). For the sake of clarity, the helix angle of the first sub-edge directly adjacent to the angle transition intersection is 33°, the helix angle of the angle transition intersection is 38° and the helix angle of the second sub-edge stays at 38°, although it will be understood that it is not essential for the helix angle of the second sub-edge to have the same value.

Nonetheless, to reduce vibrations it is preferred that the helix angles values of the different second sub-edges have some difference. In the present example, some are 38° and some are 40°.

The abrupt change in helix angle is most easily achieved by first producing a flute 22 with a helix angle and then producing a sub-flute 32 adjacent thereto. For example, the first and third teeth 20A, 20C can be ground with a helix angle of 40°. A second flute (the sub-flute) is then ground along a similar path (having the above mentioned 42° which decreases to 35° and ends directly adjacent to the transition intersection. As best shown in enlarged FIG. 3, the sub-flute 32 extends from the cutting end face in a rearward direction therefrom and the sub-flute 32 comprises a sub-flute boundary 46.

In FIG. 6 the sub-flute boundary 46 is further shown ending before reaching the adjacent tooth's relief surface 28 in the preceding direction $D_P$. Notably the sub-flute boundary 46 is shown in FIGS. 6 to 8 but is no longer visible in FIGS. 9 to 11 since the sub-flute ends at an axial position closer to the cutting end face 16.

As shown in FIG. 3, the change in helix angles from the first sub-edge 38 to the second sub-edge 40 causes the cutting edge to have a non-linear shape (i.e. forming an internal cutting edge angle $\theta$ which is less than 180°), which provides, in theory, a bump to an adjacent chip. The internal cutting edge angle $\theta$ in this example is 176°, although even an internal cutting edge angle $\theta$ of 179° is thought to be able to provide a desired bump (for initiating wear at this axial location). However, it is believed a larger angle, such as the exemplified angle having a value 176°, is preferred.

Notably, this exemplary end mill 10 has a general location GL located between 40% to 75% of the effective cutting length from the cutting end face, and the first helix angle along the first sub-edge decreases in value with increasing proximity to the angle transition intersection, which is advantageous for shouldering applications.

Further, as seen by the dashed circles in FIGS. 6 to 11, the end mill's core is tapered (i.e. enlarging with increased distance from the cutting end face). To give an example, the core designated "C1" in FIG. 9 is visibly larger than the core designated "C2" in FIG. 6.

The description above includes an exemplary embodiment which does not exclude non-exemplified embodiments from the claim scope of the present application.

What is claimed is:

1. An end mill having unitary one-piece construction and configured for shouldering and/or slotting applications and rotating about a central rotation axis ($A_R$) defining opposite axially forward and rearward directions ($D_F$, $D_R$), and opposite rotational preceding and succeeding directions ($D_P$, $D_S$), the preceding direction ($D_P$) being the cutting direction, the end mill comprising:
   opposite rear and cutting end faces; and a peripheral surface extending therebetween;
   a shank portion extending forward from the rear end face; and
   a cutting portion extending forward from the shank portion to the cutting end face;
   the cutting portion comprising:
   a diameter ($D_E$);
   an effective cutting length ($L_E$);
   a plurality of integrally formed teeth; and
   a plurality of flutes alternating with the plurality of teeth;
   at least one tooth of the plurality of teeth comprising:
   a rake surface;
   a relief surface succeeding the rake surface and having a relief surface width which is measurable in a plane perpendicular to the rotation axis ($A_R$); and
   a cutting edge formed at an intersection of the rake and relief surfaces;
   the cutting edge comprising:
   a first sub-edge extending rearwardly from the cutting end face;

a second sub-edge extending rearwardly from the first sub-edge; and an angle transition intersection defining where the first sub-edge ends and the second sub-edge starts;

the first sub-edge comprising:
a first radial rake angle;
a first helix angle; and
a first relief angle;

the second sub-edge comprising:
a second radial rake angle;
a second helix angle; and
a second relief angle;

the angle transition intersection comprising:
an intersection rake angle;
an intersection helix angle; and
an intersection relief angle;

wherein:
at least one flute of the plurality of flutes comprises a sub-flute extending from the cutting end face in the rearward direction and ending at an axial position closer to the cutting end face than the flute to which it belongs, the sub-flute having a sub-flute boundary and extending in the preceding direction from a cutting edge of one tooth towards an adjacent tooth; and wherein, for the cutting edge:
the angle transition intersection is located in a general location (GL) which extends from a point $0.20L_E$ from the cutting end face to a point $0.75L_E$ from the cutting end face;
the angle transition intersection is precisely located at a precise location (PL) within the general location (GL), the precise location (PL) being defined as a closest axial location to the cutting end face, within the general location (GL), which fulfills at least one of:
a first condition wherein the intersection rake angle is greater than all of the rake angles which are closer to the cutting end face; and
a second condition wherein the intersection helix angle is at least 5% greater than a first helix angle directly preceding the intersection helix angle.

2. The end mill according to claim 1, wherein the general location (GL) extends from a point $0.20L_E$ from the cutting end face to a point $0.50L_E$ from the cutting end facer.

3. The end mill according to claim 1, wherein both the first and the second condition are unfilled within an axial separation distance $L_P$ no greater than $0.1.5L_E$.

4. The end mill according to claim 3, wherein the axial separation distance $L_P$ is no greater than $0.05L_E$.

5. The end mill according to claim 4, wherein the axial separation distance $L_P$ is no greater than $0.02L_E$.

6. The end mill according to claim 1, wherein the intersection rake angle is at east 20% greater than the first rake angle directly adjacent thereto.

7. The end mill according to claim 6, wherein the intersection rake angle is at least 30% greater than the first rake angle directly adjacent thereto.

8. The end mill according to claim 1, wherein along the first sub-edge, the first rake angle is positive.

9. The end mill according to claim 1, wherein along the first sub-edge, the first rake angle is constant.

10. The end mill according to claim 1, wherein the intersection helix angle is at least 10% greater than the first helix angle directly adjacent thereto.

11. The end mill according to claim 1, wherein either;
the general location is located between 20% to 40% of the effective cutting length from the cutting end face, and along the first sub-edge, the first helix angle is constant; or
the general location is located from 40% to 75% of the effective cutting length from the cutting end face, and along the first sub-edge, the first helix angle decreases in value with increasing proximity to the angle transition intersection.

12. The end mill according to claim 1, wherein the intersection rake angle is greater than the first rake angle directly adjacent thereto and the intersection relief angle is smaller than the first relief angle directly adjacent thereto.

13. The end mill according to claim 1, wherein, along the first sub-edge, there is a change in relief angle, which change is visible to a naked eye.

14. The end mill according to claim 1, wherein the first relief angle gradually increases from the cutting end face in a rearward direction toward the angle transition intersection.

15. The end mill according to claim 1, wherein:
an internal tooth angle measurable between the rake surface and the relief surface is constant at each axial location along the first sub-edge.

16. The end mill according to claim 1, wherein the sub-flute boundary is spaced-apart from the second tooth's relief surface in the preceding direction.

17. The end mill according to claim 1, wherein:
the first helix angle of the cutting edge decreases in value with increasing distance from the cutting end face to the angle transition intersection; and
the second helix angle of the cutting edge is constant from the angle transition intersection to the end of the effective cutting length.

18. The end mill according to claim 17, wherein:
an additional cutting edge of the plurality of teeth, other than the previously defined cutting edge, has:
a first helix angle which decreases in value with increasing distance from the cutting end face to an angle transition intersection; and
a second helix angle which is constant from the angle transition intersection of the second cutting edge to the end of the effective cutting length; and
the second helix angle of the additional cutting edge being different from the second helix angle of said previously defined cutting edge.

19. The end mill according to claim 1, comprising at least five teeth, two non-adjacent teeth having cutting edges identical to said cutting edge of said at least one tooth.

* * * * *